United States Patent Office 3,201,198
Patented Aug. 17, 1965

3,201,198
PROCESS FOR SIMULTANEOUS PRODUCTION OF METHACRYLAMIDE AND AMMONIUM BISULFATE
Ludwig Huter and Ulrich Reichau, Frankfurt am Main, and Karl Rinn, Darmstadt, Germany, assignors to Deutsche Gold- und Silber Scheideanstalt vormals Roessler, Frankfurt am Main, Germany
No Drawing. Filed Apr. 9, 1962, Ser. No. 185,823
Claims priority, application Germany, Apr. 8, 1961, D 35,817
3 Claims. (Cl. 23—119)

The present invention relates to a process for the simultaneous production of methacrylamide and ammonium bisulfate from acetone cyanhydrin, sulfuric acid and ammonia in which practically water free ammonium bisulfate and methacrylamide can be isolated by simple separation of layers and in which considerable quantities of ammonia are saved.

It is known that methacrylamide can be prepared from acetone cyanhydrin and sulfuric acid by a heat treatment over 100° C. whereby the so-called "methacrylamide-sulfate" is formed and subsequent neutralization of the sulfuric acid (Ullmann, Encyclopedia of Technical Chemistry, vol. 12, page 396, 1950; Org. Synth., vol. III, pages 560–562).

In the processes which have become known, equivalent quantities of alkali metal or alkaline earth metal hydroxides or carbonates and, in technical processes especially of ammonia, have been employed for neutralizing the sulfuric acid in the methacrylamide-sulfate product. As a consequence, considerable quantities of by-product ammonium-sulfate were obtained in the technical processes.

The formation of these by-products and especially the formation of ammonium sulfate required considerable technical outlay in order to separate the sulfate as a saturated aqueous solution from the methacrylamide. The further processing required to produce utilizable products incurs further costs. As a consequence, German Patent 892,591 describes a process in which the methacrylamidesulfate is treated with an equivalent quantity of gaseous ammonia in a special apparatus without addition of water. By using the heat of neutralization, the methacrylamide can be directly separated off from the neutralization mixture by sublimation.

A process is described in U.S. Patent 2,431,468 in which the sulfuric acid half ester of acetone cyanhydrin is neutralized with ammonia or ammonium sulfate and then converted to methacrylamide by heating. In this process also considerable quantities of ammonia or ammonium sulfate are required for the neutralization in view of the excess of sulfuric acid used.

According to the invention it was unexpectedly found that it is not necessary in order to obtain methacrylamide to neutralize all of the sulfuric acid contained in the so-called methacrylamide-sulfate. In the process according to the invention, the completely reacted reaction mixture obtained from about equimolecular proportions of acetone cyanhydrin and sulfuric acid, namely, the so-called "methacrylamide-sulfate" is treated with about a half an equivalent of ammonia to produce methacrylamide and ammonium bisulfate simultaneously which separate into easily separable phases at elevated temperatures. It is especially favorable for separation of the phases that the process be carried out at temperatures between 100 and 180° C. Methacrylamide is in the fused state within this range and consequently can be easily separated from the ammonium bisulfate in which it is insoluble.

It is also of advantage to carry out the treatment with ammonia and/or the phase separation in the presence of 0.1 to .5 mol of water calculated on 1 mol of original acetone cyanhydrin.

When the phase separation is effected at temperatures above 110° C. the ammonium bisulfate can also be separated more easily in a pure and fused state. Ammonium bisulfate which is recovered in this way is already so pure that normally no further treatment, such as extraction, is required to remove methacrylamide contained therein. However, should this measure be required under special circumstances, an extraction can be effected with suitable solvents or mixtures of solvents, especially aromatic or chlorinated hydrocarbons such as benzene, xylene, toluene, chloroform, trichloroethylene and perchloroethylene. Ammonium bisulfate thus treated is of excellent purity.

The ammonia treatment can be with gaseous or liquid ammonia. The water which may also be used in conjunction with the process can also be contained therein, for example, by using aqueous ammonia. Such water can, however, also be added separately either in liquid or vapor form. It is of advantage to add the water before or during the ammonia treatment. The quantity of ammonia employed preferably is between 1 and 1.1 mol per mol of sulfuric acid content of the methacryamide-sulfate so as to provide about ½ an equivalent of ammonia per mol of sulfuric acid.

The process according to the invention is advantageously carried out under pressure and continuously. Formation of by-products, such as α-isobutyric acid amide, is practically excluded.

The advantages of the process not only reside in considerable savings in ammonia requirements but also in the high yields of methacrylamide and ease of separation of the products of the process as both phases which are produced are liquids under the preferred conditions and are of different specific gravity and separate quickly and completely.

The methacrylamide which is obtained in almost quantitative yields when the process is carried out continuously is sufficiently pure for a number of technical uses. If it is to be used for polymerization, it can be brought to the required purity by the usual purification procedures, such as crystallization, sublimation or extraction.

The following example will serve to illustrate several embodiments of the invention.

*Example 1*

652 g. (3.57 mols) of a mixture of acetone cyanhydrin and sulfuric acid (1:1) which had been heated for about 15 minutes to 125° C. were placed in a 1 liter flask provided with a stirrer and reflux condenser and 16 g. of $H_2O$ (=0.89 mol corresponding to a molar ratio of 1:0.25) added thereto. This mixture was then recycled in a small cycle with a glass vane pump rotating at 2500 r.p.m. and a following tube cooler. Gaseous $NH_3$ was then metered from an 0.5 kg. container into the cycle on the pressure side of the cycle shortly before the cooler. The temperature of the reaction mixture was maintained at about 140° C. After 30 minutes about 70 liters of $NH_3$ had been introduced. Weighing of the ammonia container before and after delivery showed that 62 g. of ammonia (=3.65 mols) had been supplied to the acetone cyanhydrin sulfuric acid reaction mixture which corresponded to a molar ratio of reaction mixture to $NH_3$ of 1:1.02. The resulting reaction mixture was then introduced into a separator maintained at 120° C. and the phases separated. The lower phase solidified at 110–115° C. to a hard white crystalline plate weighing 418 g. The organic layer began to thicken to a thick slurry of yellowish white platelets weighing 308 g. at about 95–100° C. The weight of the products as compared to the materials supplied showed an 0.56% loss. The analyses of the phases gave the following distribution:

|  | Inorganic Phase | | | Organic Phase | | | Total Percent of Th. |
|---|---|---|---|---|---|---|---|
|  | G. | Percent by wt. | Percent of Th. | G. | Percent by wt. | Percent of Th. |  |
| As NH$_4$HSO$_4$ | 397.3 | 95.1 | 96.8 | 2.1 | 0.69 | 0.5 | } 99.44 |
| As (NH$_4$)$_2$SO$_4$ | 8.4 | 2.01 | 2.14 |  |  |  |  |
| MA-Amide | 0.7 | 0.17 | 0.23 | 271.0 | 88.8 | 89.14 | 89.37 |
| MA-Acid |  |  |  | 8.9 | 2.91 | 2.9 | 2.9 |
| H$_2$O | 9.16 | 2.19 | 57.25 | 5.04 | 1.65 | 31.5 | 88.75 |
| Polymer | 2.5 | 0.6 | 0.82 | 18.3 | 6.0 | 6.02 | 6.84 |
|  | 418.06=100% | | | 305.34=99.14% | | |  |

Example 2

2,500 cc. (=1,770 g.=9.66 mols) of a 1:1 reaction mixture of acetone cyanhydrin and sulfuric acid and 270 cc. (=165 g.=9.7 mols) of liquid ammonia were respectively supplied per hour over stainless steel (V4A) metering pumps, the heads of which were heated to 110° C. and 20° C., to a mixing chamber of stainless steel maintained at 155° C. and then to a stainless steel coil of 300 cc. capacity maintained at an average temperature of 170° C. The system was maintained under a nitrogen counter pressure equal to the partial pressure of NH$_3$ at 20° C., namely, about 8 atmospheres gauge pressure. The reacted mixture was then released to a separator maintained at about 150° C. under a pressure of about 200–300 mm. Hg. The NH$_4$HSO$_4$ melt was drawn off and the methacrylamide formed was passed over an active carbon containing tower heated to 150° C. and sublimed against three small ribbed coolers having a total cooling surface of 0.7 m.². The following yields per hour were obtained: 1,125 g. ammonium salts and 760.3 g. of sublimed methacrylamide of a freezing point of 110° C. 34.5 g. of further methacrylamide were recovered by washing the active carbon with benzene. The analyses of the producs were as follows:

|  | Inorganic Phase | | | Organic Phase | | | Total Percent of Th. |
|---|---|---|---|---|---|---|---|
|  | G. | Percent by wt. | Percent of Th. | G. | Percent by wt. | Percent of Th. |  |
| As NH$_4$HSO$_4$ | 1,100.0 | 98.0 | } 99.72 |  |  |  | 99.72 |
| As (NH$_4$)$_2$SO$_4$ | 7.9 | 0.7 |  |  |  |  |  |
| MA-Amide |  |  |  | 794.8 | 100 | 96.8 | 96.8 |
| Polymer | 17.2 | 1.3 | 2.1 |  |  |  | 2.1 |
|  | 1,125.0 | | | 794.8 | | |  |
|  | 794.8 ← | | | | | | |
|  | 1,919.8 | About 99.2% of the quantity of materials supplied | | | | | |

We claim:

1. A process for the simultaneous production of methacrylamide and ammonium bisulfate which comprises contacting a completely reacted reaction mixture of about equivalent quantities of acetone cyanhydrin and sulfuric acid with about ½ an equivalent of ammonia with reference to said sulfuric acid in the presence of up to 0.5 mol of water per mol of original acetone cyanhydrin and separating the resulting methacrylamide and ammonium bisulfate phases the formation of the methacrylamide and ammonium bisulfate and the separation of the phases being carried out at a temperature between 100 and 180° C. at which the components of the reaction mixture are in the liquid phase.

2. The process of claim 1 in which 0.1 to 0.5 mol of water per mol of original acetone cyanhydrin is present during the treatment of the reaction mixture with the amomnia.

3. A process for the continuous simultaneous production of methacrylamide and ammonium bisulfate which comprises continuously contacting a completely reacted reaction mixture of about equivalent quantities of acetone cyanhydrin and sulfuric acid with about ½ an equivalent of ammonia with reference to said sulfuric acid in the presence of up to 0.5 mol of water per mol of original acetone cyanhydrin at superatmospheric pressure and continuously separating the resulting methacrylamide and ammonium bisulfate phases the formation of the methacrylamide and ammonium bisulfate and the separation of the phases being carried out at a temperature between 100 and 180° C. at which the components of the reaction mixture are in the liquid phase.

References Cited by the Examiner

UNITED STATES PATENTS 3,027,328  3/62  Huter _____ 260—561

MAURICE A. BRINDISI, *Primary Examiner.*